(12) United States Patent
Sayers et al.

(10) Patent No.: US 11,481,049 B2
(45) Date of Patent: Oct. 25, 2022

(54) DIVOTS FOR ENHANCED INTERACTION WITH STYLUSES

(71) Applicant: HEWLETT-PACKARD DEVELOPMENT COMPANY, L.P., Houston, TX (US)

(72) Inventors: Craig Peter Sayers, Palo Alto, CA (US); Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 923 days.

(21) Appl. No.: 16/076,128

(22) PCT Filed: Apr. 11, 2017

(86) PCT No.: PCT/US2017/026935
§ 371 (c)(1),
(2) Date: Aug. 7, 2018

(87) PCT Pub. No.: WO2018/190801
PCT Pub. Date: Oct. 18, 2018

(65) Prior Publication Data
US 2021/0200331 A1    Jul. 1, 2021

(51) Int. Cl.
*G06F 3/038* (2013.01)
*G06F 3/0354* (2013.01)

(52) U.S. Cl.
CPC ......... *G06F 3/038* (2013.01); *G06F 3/03545* (2013.01)

(58) Field of Classification Search
CPC ...... G06F 3/038; G06F 3/03545; G06F 1/169; G06F 3/03; H04M 1/233
See application file for complete search history.

(56) References Cited

U.S. PATENT DOCUMENTS

| | | | |
|---|---|---|---|
| 6,125,337 A | 9/2000 | Rosenberg et al. | |
| 7,102,626 B2 | 9/2006 | Denny | |
| 7,623,121 B2 | 11/2009 | Dodge | |
| 9,400,570 B2 | 7/2016 | Chang | |
| 10,042,442 B2* | 8/2018 | Kwak | G06F 1/1607 |
| 2002/0057262 A1 | 5/2002 | Patrick et al. | |
| 2003/0076302 A1* | 4/2003 | Langstraat | G06F 1/1626 |
| | | | 345/161 |
| 2004/0135765 A1* | 7/2004 | Kinerk | G06F 1/169 |
| | | | 345/156 |
| 2004/0155862 A1* | 8/2004 | Higginson | G06F 1/1626 |
| | | | 345/156 |
| 2004/0162700 A1 | 8/2004 | Rosenberg et al. | |
| 2005/0012711 A1 | 1/2005 | Paolucci et al. | |
| 2005/0057533 A1 | 3/2005 | Liu | |

(Continued)

OTHER PUBLICATIONS

Horsey, "Apple Pencil, iPad Pro Stylus Pen Holder Unveiled", Retrieve from internet—https://www.geeky-gadgets.com/apple-pencil-ipad-pro-stylus-pen-holder-unveiled-26-10-2015/, Oct. 26, 2015, 7 Pages.

*Primary Examiner* — Lunyi Lao
*Assistant Examiner* — Jarurat Suteerawongsa
(74) *Attorney, Agent, or Firm* — Fabian VanCott

(57) ABSTRACT

A system for providing input to a computer, the system including: a stylus with a first end, the first end to provide position information to the computer; and a plurality of divots, wherein when the first end of the stylus is in a divot, the system detects an orientation of the stylus.

19 Claims, 12 Drawing Sheets

(56) References Cited

U.S. PATENT DOCUMENTS

| | | | |
|---|---|---|---|
| 2005/0190163 A1 | 9/2005 | Sarasmo et al. | |
| 2005/0275623 A1* | 12/2005 | Chadha | G06F 3/0312 |
| | | | 345/156 |
| 2006/0244737 A1* | 11/2006 | Dodge | G06F 3/0393 |
| | | | 345/179 |
| 2008/0231614 A1* | 9/2008 | Huang | G06F 1/1698 |
| | | | 345/179 |
| 2009/0113091 A1* | 4/2009 | Miller | G06F 3/046 |
| | | | 710/64 |
| 2009/0115744 A1* | 5/2009 | Zhang | G06F 3/03545 |
| | | | 345/179 |
| 2011/0285671 A1* | 11/2011 | Wu | G06F 3/0362 |
| | | | 345/179 |
| 2012/0127088 A1 | 5/2012 | Pance et al. | |
| 2014/0071097 A1* | 3/2014 | Namie | G06F 1/1607 |
| | | | 345/179 |
| 2015/0205420 A1* | 7/2015 | Calub | G06F 3/04886 |
| | | | 345/173 |
| 2016/0139690 A1* | 5/2016 | Chang | G06F 3/03545 |
| | | | 345/179 |

* cited by examiner

DIVOTS FOR ENHANCED INTERACTION WITH STYLUSES

BACKGROUND

Electronic devices continue to become more frequent in society. While voice control and eye tracking have had some implementations, most electronic devices continue to receive user input from a user's hands. Smaller devices with more powerful processors have produced challenges in providing input methods to replace a keyboard and/or a mouse which would occupy a comparatively large footprint on a portable device. Touchpads have seen increasing use in phones and tablets due to their ability to incorporate input into the display.

BRIEF DESCRIPTION OF THE DRAWINGS

The accompanying drawings illustrate various examples of the principles described herein and are a part of the specification. The illustrated examples do not limit the scope of the claims.

Figure 1:
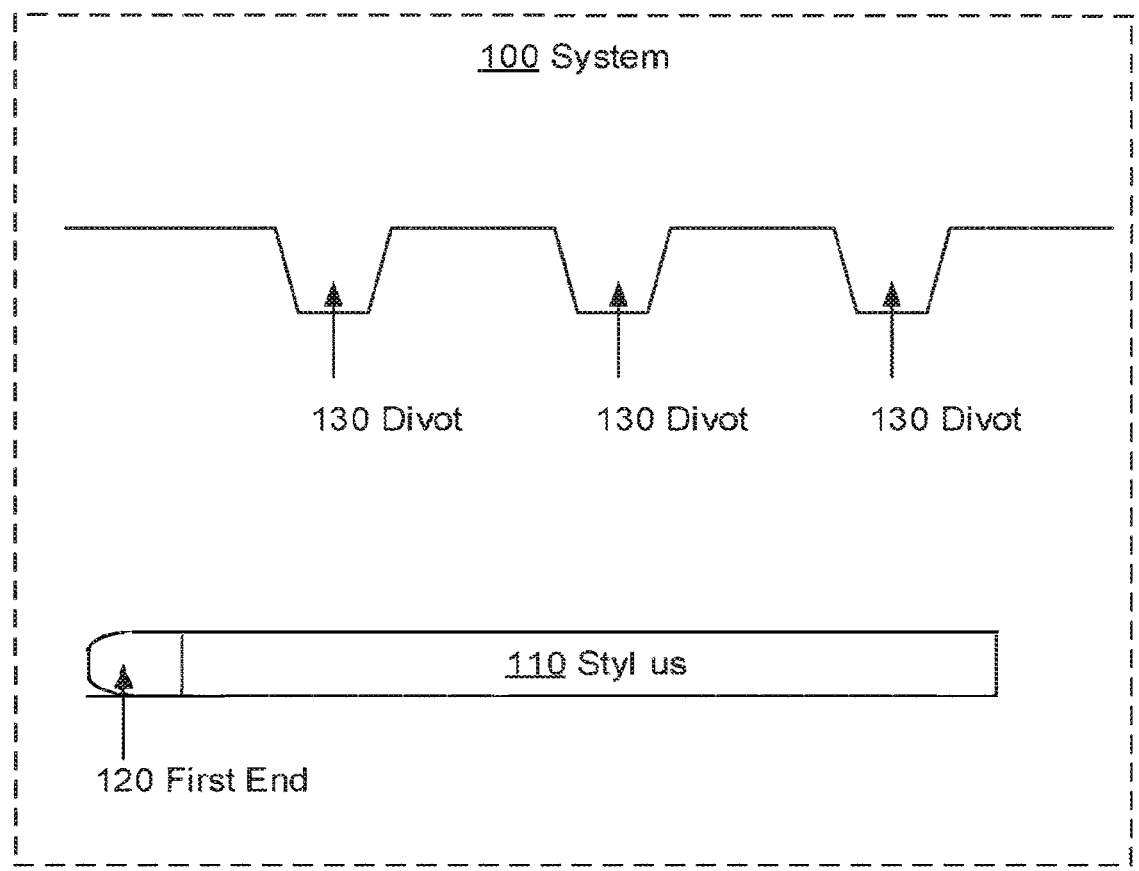
FIG. 1 shows an example of a system for providing input to a computer consistent with the present specification.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices continue to use a variety of ways for users to provide information. While punch cards and magnetic tape have seen significant decreases in use, the problem of providing user input that is reliable and intuitive for users has proven challenging. Audio controls continue to develop for example. Keyboard and mice are widely used but have issues with portability. This may be a concern for smaller devices such as tablets and phones. Touched based user interfaces have seen increasing adoption for small devices but are limited in their precision and the speed of information entry.

The use of a stylus with a detecting surface offers advantages and disadvantages compared with touch. For example, a stylus may be lost. A stylus may be moved more precisely with less effort, in part due to users' developed skills in writing with a brush, pen, and/or pencil. However, while handwriting recognition continues to improve, the error tolerance to obtain decent recognition may limit the number of input options.

This specification describes the use of divots as a way to provide input into a computing system with a stylus. The divots anchor one end of the stylus, limiting the degrees of freedom of motion the stylus may undertake. This reduces the system requirements to make an accurate determination of the stylus' position, rotation, or other features. The divot may include sensors built into the substrate containing the divot. The stylus may include sensors. Remote sensors may be used; for example, a camera directed toward the space occupied by the stylus. The presence of the stylus in a given divot may be used to interpret the motion applied to the stylus. This allows each divot to include input that is automatically included when the stylus is placed in the divot.

Divots may be arranged in arrays, lines, patterns, etc. Divots may be connected by slots or other mechanical elements to facilitate movement of the stylus into a divot and/or between divots.

Among other examples, this specification describes a system for providing input to a computer, the system including: a stylus with a first end, the first end to provide position information to the computer; and a plurality of divots, wherein when the first end of the stylus is in a divot, the system detects an orientation of the stylus.

This specification also describes a method of providing information to a computing system; the method including: detecting a first end of a stylus and providing information into the computing system based on a detected position of the first end of the stylus; detecting placing placement of the first end of the stylus into a divot, wherein a same grip on the stylus is used while placing the stylus into the divot and when detecting the position of the first end of the stylus; and while the first end of the stylus remains in the divot; detecting manipulation of the stylus and providing information into the computer system based on the manipulation of the stylus.

This specification describes an electronic device, the device including: a control; and a divot associated with the control, wherein placing a stylus into the divot allows adjustment of a parameter associated with the control using the stylus.

This specification also describes an electronic device; the device including a slot with a divot in the slot; wherein then a first end of a stylus is in the divot, manipulation of the stylus provides input into the electronic device.

Turning now to the figures, FIG. 1 shows an example of a system (100) for providing input to a computer consistent with the present specification. The system (100) includes: a stylus (110) with a first end (120), the first end (120) to provide position information to the computer; and a plurality of divots (130), wherein when the first end (120) of the stylus (110) is in a divot (130), the system (100) detects an orientation of the stylus (110).

The system (100) is a system for providing input to a computing system. The system includes: a stylus (110) with a first end (120) and a plurality of divots (130).

The computing system may be a personal computer, a phone, a server, a tablet, a television, and/or any similar computing system. The computing system receives information about the stylus (110) orientation when the first end (120) of the stylus (110) is in a divot (130). The information may come from sensors located in and/or near the divot (130). The information may come from the stylus (110). The information may come from other sensors, for example, from a camera that views the stylus (110) in the divot (130).

The stylus (110) is an instrument for providing information to a computer system. The stylus (110) may be an active electrical device. The stylus (110) may be a mechanical device. The stylus (110) may include components to provide signals. For example, the stylus (110) may include a passive element to facilitate determination of orientation, such as: a magnet; a light source; a surface to indicate orientation; e.g., a radial portion with a different texture and/or appearance; a mechanical feature to indicate orientation, e.g., a protrusion and/or slot. The stylus (110) may include active elements to provide signals and/or information to sensors and/or the computer system.

Figure 1A:
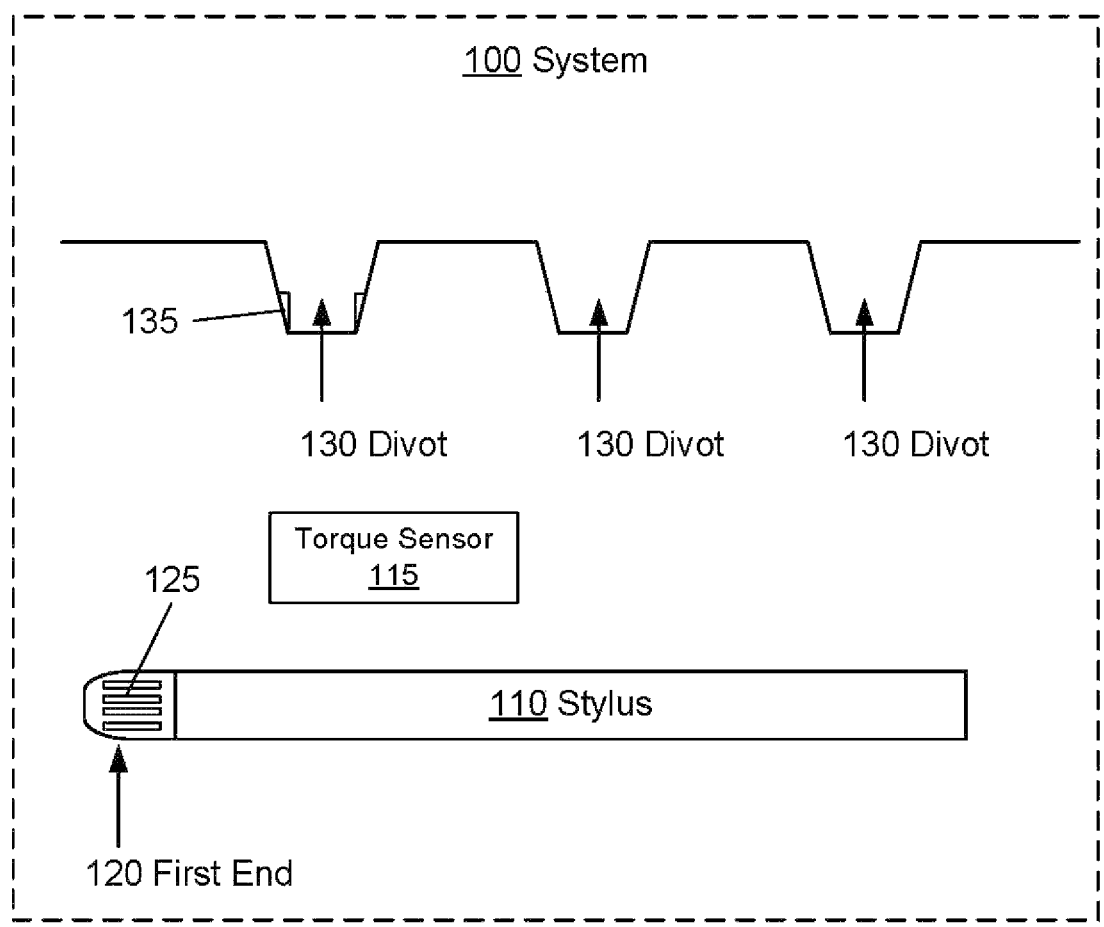
FIG. 1A shows additional possible features of an example of the system described herein.
Figure 1B:
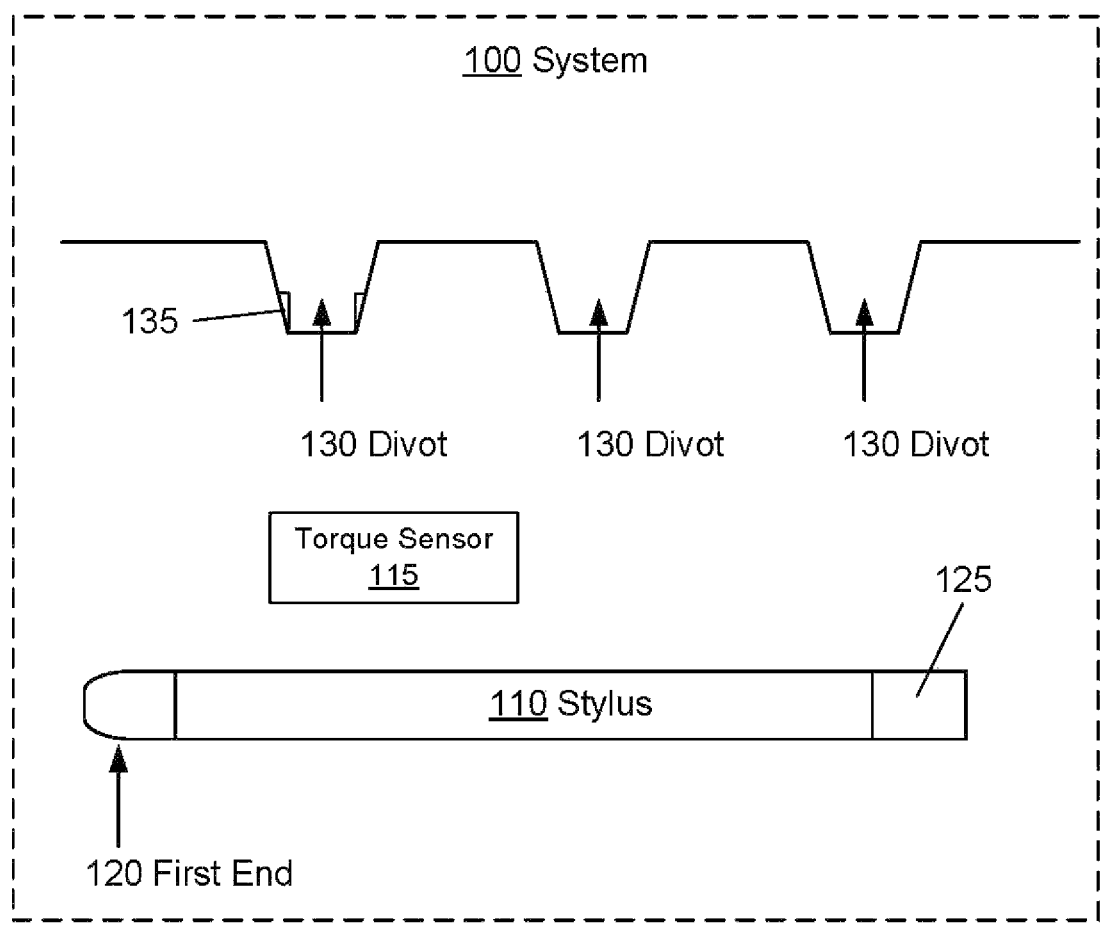
FIG. 1B shows additional possible features of an example of the system described herein.

The stylus (110) may include a target (125, FIG. 1B) on a second end of the stylus (110), the second end opposite the first end (120). The target may aid in locating the second end of the stylus (110), this information may be coupled with a position of the divot (130) and length of the stylus (110) to determine the orientation of the stylus (110) while the first end (120) is in the divot (130). In one example, the target is detected by a camera. The camera may be above the divot (130), e.g., overhead. The camera may be underneath the divot (130). The camera may be a plurality of cameras located around the divot (130) and allowing determination of the position of the target.

In one example, the target is a mechanical feature, for example, a sphere. The target may include a variety of patterning and/or texturing to provide orientation and/or rotation data. The target may be an electromagnetic element. For example, the target may include a Radio Frequency Identification (RFID) tag that, in response to an external stimulation, produces a signal that may be triangulated to determine the tag's position. The stylus (110) may include multiple RFID tags, for example, one located at the first end (120) and a second located at the second end of the stylus (110). One advantage of this approach is the use of a passive RFID tag may avoid the need for a power source in the stylus (110).

The stylus (110) may include a power source. The power source may be used to power active signals from the stylus (110). The stylus (110) may emit a first signal from the first end (120). The stylus (110) may emit a second signal from the second end. In one example, the power source is inductively charged by another device, e.g., a computing system. The power source may include a battery. The power source may include a capacitor.

The stylus (110) may include a unique identifier that is conveyed to a computing system as part of providing a signal. The use of the identifier may be included to document activities performed with the stylus (110) and/or to control access. In one example, input from the stylus (110) may only be accepted when the stylus (110) is proximate to another device, for example, a phone.

Figure 1C:
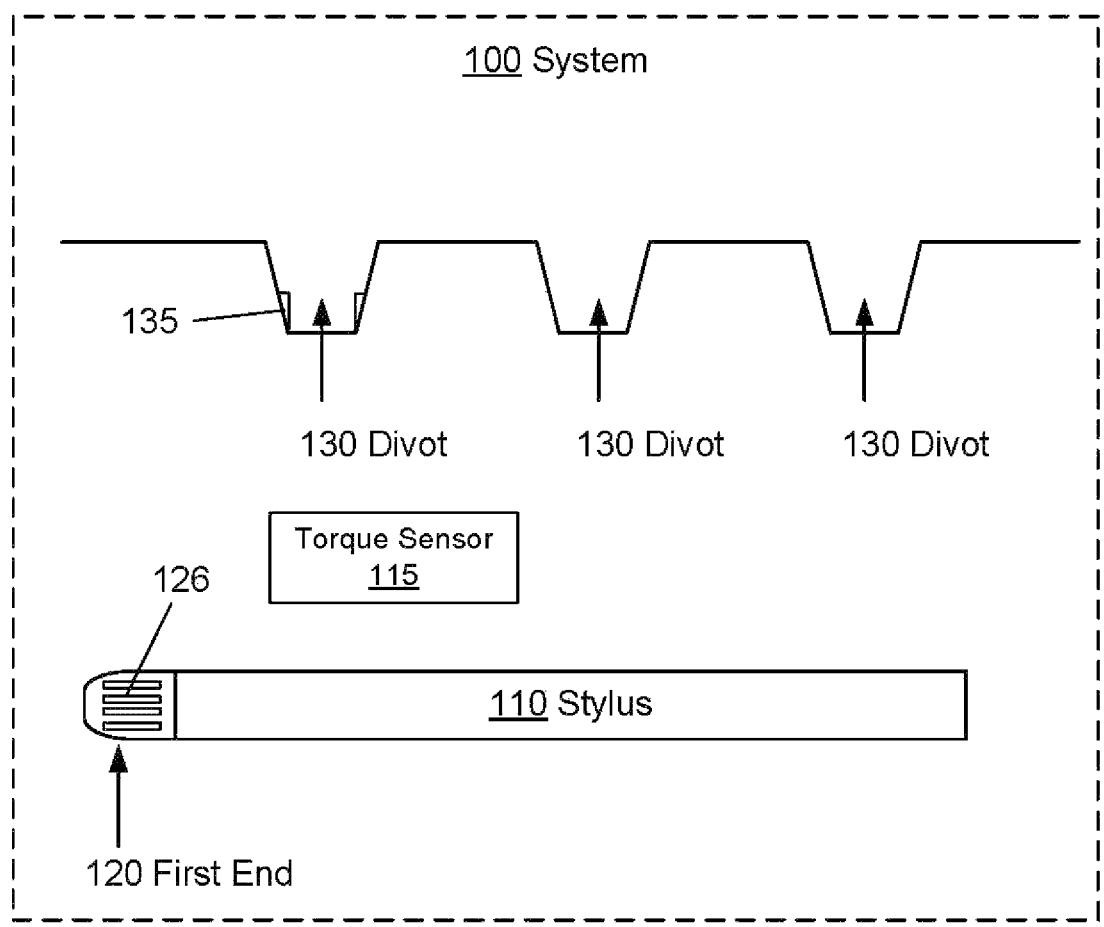
FIG. 1C shows additional possible features of an example of the system described herein.

The first end (120) of the stylus (110) is the end used to interact with the divot (130). The first end (120) may be radially symmetrical such that the first end (120) rotates smoothly in the divot (130). The first end (120) may have a visual and/or texture based feature (126, FIG. 1C) that allows detection of rotation in the divot (130). For example, the first end (120) may have a plurality of stripes of different widths. The first, end (120) may have patterning and/or texturing to allow determination of the rotational position of the first end (120) as well as changes in the rotational position of the first end (120).

The first end (120) of the stylus (110) may have a mechanical element to allow the stylus (110) to apply a torque to the divot (130). In one example, the first end (120) includes a ribbed collar and/or band that interacts with non-uniformities in the divot (130). The first end (120) may have a toothed ring or collar (125, FIG. 1A) which interacts with a toothed perimeter (135, FIG. 1A) of the divot (130). The first end (120) may have a keyed portion that interlocks with the divot (130). These components may allow effective torque application between the stylus (120) and the divot (130). The applied torque may be measured, for example, with a torque sensor (115, FIG. 1A), and used as an input for a computer system.

The plurality of divots (130) may be located in a common substrate. The plurality of divots (130) may be located in multiple substrates. For example, one divot may be located in a tablet, a second divot may be located on, a desk, a third divot may be located on a keyboard, etc. In one example, the system includes a portable and/or disposable divot that may be applied to surfaces as needed. (See FIG. 7C, showing bent corner 131 to indicate the portability and disposability of the device). The divot (130) provides a location that anchors the first end (120) of the stylus (110). By constraining the first end (110) of the stylus (110) motion of other end of the stylus (110) and the corresponding orientation of the stylus (110) can more readily and reliably be determined.

A divot (130) may be located in a second device, where the position of the second device is detected relative to a computing device. For example, a divot (130) may be located in a straight edge, template, curve, and/or other drafting tool. A divot (130) may be located in a brush indicator, such that when the first end (120) of the stylus (110) is in the divot (130) in the brush indicator, the computing system uses a first brush template to input changes to a document. A user may then adjust the first brush template using the stylus (110). The user may remove the stylus from the divot and the system applies a second brush template to contacts by the stylus (110) outside the divot (130).

A divot (130) may include an associated sensor. The sensor may allow detection of the presence of the first end (120) of the stylus (110) in the divot (130). The sensor may detect rotation of the stylus (110). The sensor may detect orientation of the stylus (110). The sensor may measure a torque between the divot (130) and the stylus (120).

The stylus (110) may include an associated sensor. The sensor may allow detection of the presence of the first end (120) of the stylus (110) in a divot (130). The sensor may detect which divot (130) is occupied by the first end (120) of the stylus (110). For example, the stylus (110) may include a sensor to read a Near Field Communication (NFC) tag embedded near the divot. The stylus (110) may detect markings, texturing, coloring, shape, geometry, and/or other features associated with a divot (130).

The system (100) may include the following types of sensors: stress sensor, strain sensor, pressure sensor, contact sensor, proximity sensor, camera, optical sensor, electromagnetic field sensor, inertia sensor, gyroscope, and combinations thereof. The system may locate sensors in a substrate near the divot (130), in the stylus (110) including in the first end (120) of the stylus, and/or in other locations. Placement of the sensors depends on the intended use, capabilities of the sensor and an associated processor, design requirements, use conditions, etc.

The system (100) may include an active or passive electromagnetic signal provided by the stylus (110). This may interact with an array of electrical field sensors, for example, located underneath a display or around a divot (130).

In one example, the ability to detect orientation of the stylus (110) is limited to when the first end (120) of the stylus (110) is in a divot (130). By fixing the location of the first end (120), accurate determination of the orientation of the stylus is simplified. For example, this approach allows sensors used in making the determination to be situated to minimize noise, maximize coverage, and/or increase accuracy of measurements used to determine orientation. Limiting detection of stylus (110) orientation to when the first end (120) is in a divot (130) may reduce the number of sensors and/or reduce the cost of sensors used in the system. Limiting detection of stylus (110) orientation to when the first end is in a divot (130) may reduce the load on a processor, for example, a processor of the computing system that is calculating the orientation from sensor data.

In one example, the presence of the first end (120) of the stylus (110) in a divot (130) modifies how the computer system interprets a provided input. The provided input may be modified depending on which divot (130) of the plurality of divots (130) contains the first end (120) of the stylus (110). For example, rotation of the stylus (100) in a first divot (130) may be interpreted as increasing (clockwise) or decreasing a speaker volume, while rotation of the stylus (100) in a second divot may increase or decrease brightness of a display. In another example, placement of the first end (120) of the stylus (110) in a first divot (130) may tell the computer system to apply the inputs from the stylus (110) to a first object, for example, a first text style, and placement of the first end (120) in a second divot (130) may tell the computer system to apply the inputs from the stylus (110) to a second object. Adjusting the angle up and down of the stylus (110) while the first end (120) remains in the first divot (130) may increase or decrease the text size. Adjusting the orientation of the stylus left to right may adjust the font color. Rotating the stylus may scroll through different fonts. The availability of both forward/backward and right/left motion of the free end of the stylus (110) allows a large amount of information to be rapidly selected. For example, picking out colors, or other tasks that are more readily organized in a two-dimensional array than a one-dimensional array. Rotation and/or applied torque provide a third axis of motion that can be provided to a computer system.

Figure 2:
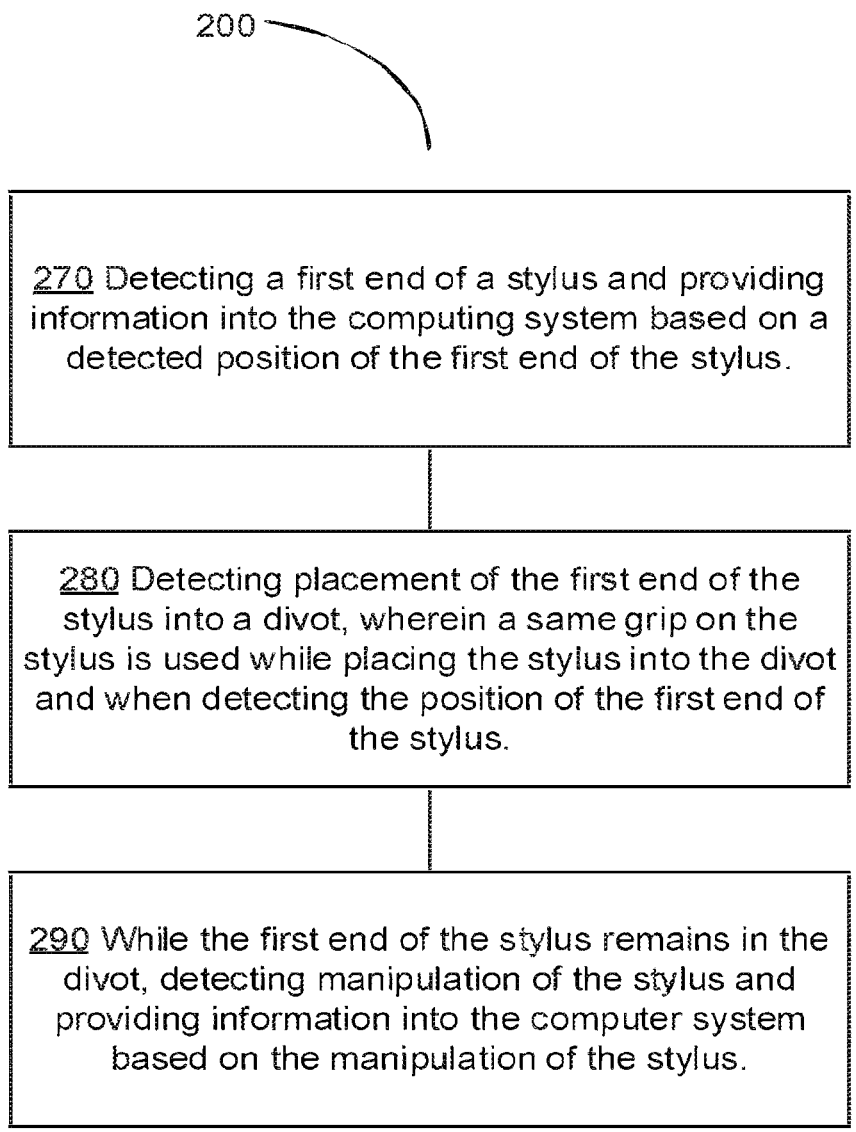
FIG. 2 is a flowchart of a method of providing information to a computing system in an example consistent with the present specification.

FIG. 2 is a flowchart of a method (200) of providing information to a computing system in an example consistent with the present specification. The method (200) includes: detecting a first end (120) of a stylus (110) and providing information into the computing system based on a detected position of the first end (120) of the stylus (110) (270); detecting placement of the first end (120) of the stylus (110) into a divot (130), wherein a same grip on the stylus (110) is used while placing the stylus into the divot (130) and when detecting the position of the first end (120) of the stylus (110) (280); and while the first end (120) of the stylus (110) remains in the divot (130), detecting manipulation of the stylus (110) and providing information into the computer system based on the manipulation of the stylus (110) (290).

The method (200) is a method of providing information to a computing system using a stylus (110).

The method includes, detecting a first end (120) of a stylus (110) and providing information into the computing system based on a detected position of the first end (120) of the stylus (110) (270). The information may be added as strokes, place data, characters, etc. The use of a stylus to enter media into a computing system takes advantage of the natural hand position used in writing and users' experience writing with a brush, pen, pencil, crayon, and/or other similar instrument. In some examples, the pressure applied by the first end (120) of the stylus (110) activates position sensors. The first end (120) may be tracked with a camera. The first end (120) may provide an electrical, magnetic, optical, and/or other signal that is detected by a sensor and used to locate a position.

The method includes, detecting placement of the first end (120) of the stylus (110) into a divot (130), wherein a same grip on the stylus (110) is used while placing the stylus into the divot (130) and when detecting the position of the first end (120) of the stylus (110) (280). The ability to place the first end (120) of the stylus (110) into a divot (130) while maintaining a grip on the first portion of the stylus (110) facilitates rapid access to provide input to a computer system using the divot (130). In contrast, placing the stylus (110) in a stylus holder and/or case slows the operation and induces wear in the holder/case. This ability to naturally move to enter data via the divot (130) and back again facilitates seamless operation for the user and allows adjustment of system parameters.

The method includes, detecting manipulation of the stylus (110) and providing information into the computer system based on the manipulation of the stylus (110) (290). The manipulation may be any combination of a variety of actions, including but not limited to: pressure of the stylus (110) on the divot (130) rotation of the stylus (110); pushing the stylus (100) forward, backward, left, and/or right; applying a torque between the stylus (110) and the divot (130); and/or manipulating a control on the stylus (110) such as a slider, knob, button, and/or similar control. The large numbers of independent axis allow a large variety of states to be accessed quickly. In one example, the inputs are mapped to existing controls for a mouse, e.g., up/down/left/right, the use of rotation for the scroll wheel and pressure (none, light, hard) in the divot (130) for the mouse button (no action, click, double click). However, unlike a mouse, the stylus (110) is already in hand, allowing similar functionality to be obtained without having to change hands (assuming a mouse is available, for many portable electronic devices such an input device is not available).

Figure 3:
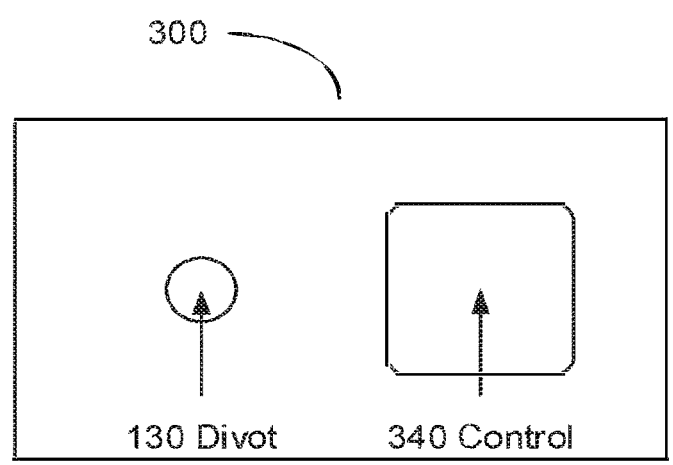
FIG. 3 shows a top view of an example of an electronic device according to one example consistent with the present specification.

FIG. 3 shows a top view of an example of an electronic device (300) according to one example consistent with the present specification. The device (300) including; a control (340); and a divot (130) associated with the control (340), wherein placing a stylus (110) into the divot (130) allows adjustment of a parameter associated with the control (340) using the stylus (110).

The electronic device (300) may be a wide variety of devices, for example, a laptop, a camera, a tablet, a phone, a remote, a personal computer, a server, a mouse, a trackball, a printer, an auxiliary device, etc.

The control (340) provides at least two states. The control (340) may provide a wide variety of states. The control (340) may be, for example: a button, a slider, a knob, a switch, a contact, a sensor, a throttle, a lever, a In many cases, activating the control (340) causes a predetermined action to occur for an associated computer system. The action is controlled by parameters. The parameters may be adjusted by manipulating the stylus (110) while the first end of the stylus (120) is in the divot (130). The large number of independent axes of manipulation of the stylus (110) allows rapid and reliable modification of the parameters associated with the control (340).

In one example, a control (340) is associated with activating a camera. The associated divot (130) may be used to adjust parameters such as exposure length, post processing, image size, filter selection, etc. In another example, when the control (340) is activated a preselected "favorite" media channel. The associated divot may be used to adjust parameters such as channel, volume, closed captioning, etc, A control (340) may be a power button, where the associated divot (130) allows selection between restart, power down, sleep, etc. as the default state when pushing the button. This approach allows a user to readily adjust settings without having to select the desired setting each time.

The divot (130) may be adjacent to the control (340). The divot (130) may be adjacent to a label for the control (340). The divot (130) may be within the footprint of the control (340). For example, a button may include the associated divot (130) within the perimeter of the button. A switch may have the divot located near the axis allowing access in both states. The switch may have the divot (130) located on one side so it is only accessible when the switch is in a first state and not when the switch is in a second state.

The device (300) may include a display. In one example, placing a first end (120) of the stylus in the divot (130) causes display of the current parameters on the display. As the user manipulates the stylus (110), the parameters are adjusted on the display until the stylus (110) is removed. Display of the parameters may include values (numbers), colors, symbols, etc. The device (300) may provide other feedback to indicate adjustment of the parameters. For example, the device may produce a click as a parameter passes a given value and/or every X units. The device (300) may provide haptic feedback. In one example, the torque between the stylus (110) and the divot (130) informs the user about the value being provided to the device.

Figure 4:
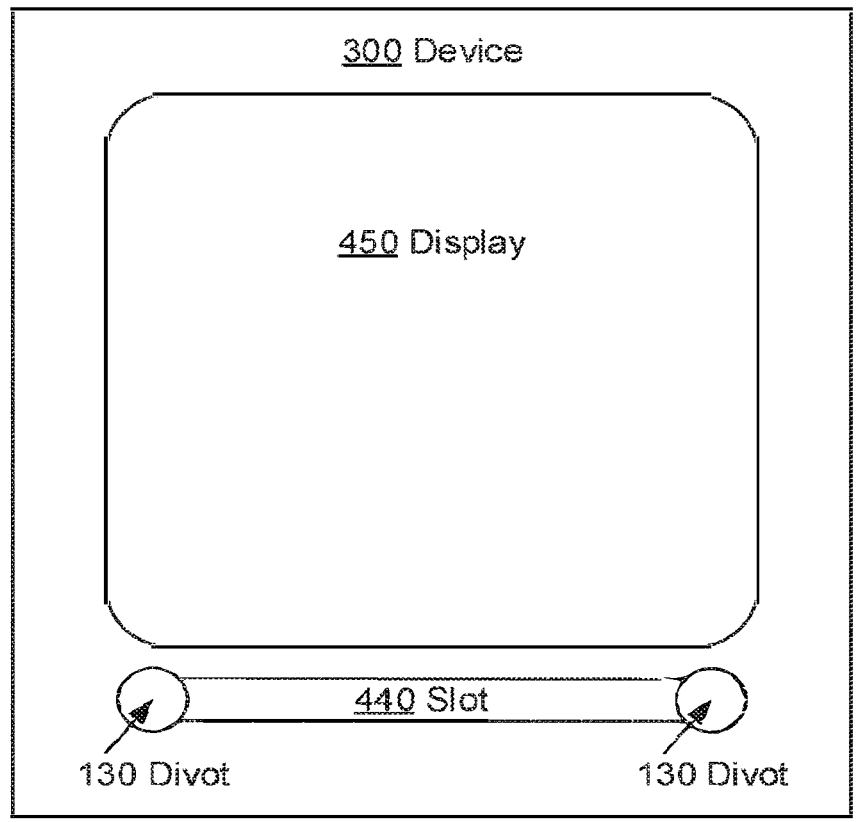
FIG. 4 shows a top view of a device consistent with the present disclosure.

FIG. 4 shows an overhead view of a device (300) consistent with the present disclosure. The device (300) includes a plurality of divots (130) connected by a slot (440). The device (300) includes a display (450) to provide information to a user.

The slot (440) provides a recess in a surface and is connected to a divot (130). The slot (440) facilitates tracking the first end (120) of the stylus (110) to a divot without having to visually track the tip of the stylus (110). The simple version of the slot (440) shown in FIG. 4 allows tracking of the stylus from a first divot (130) to a second divot (130). The slot (440) may be roughly the width of the first end (120) of the stylus (110). The slot (440) may be wider that the width of the first end (120) of the stylus (110).

The display (450) is part of an electronic device (330), The display (450) allows information, video, text, data, and other output to be displayed for a user. In one example, the display is a touch sensitive display that interacts with the first end (120) of the stylus (110). The display (450) may be on a different device (300) than the device (300) with the divot (130). For example, the display (450) may be a monitor or television. The divot (130) may be in a remote, allowing modification of the output of various controls. For example, a divot (130) may adjust the volume increment size.

The display (450) and the divot (130) may be in a common device (300). For example, the display (450) may include a set of divots (300) along an edge of the display (450).

Figure 5:
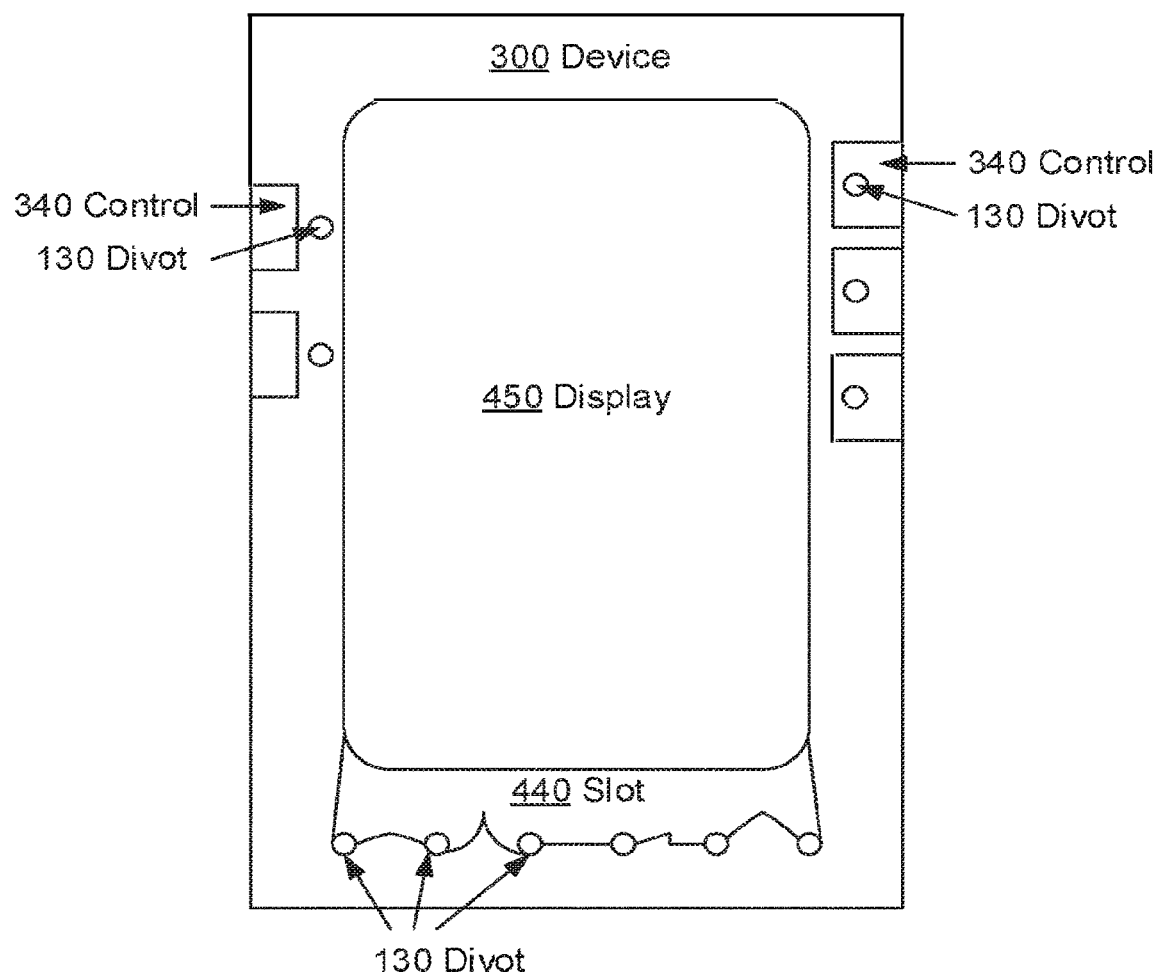
FIG. 5 shows an overhead view of a device consistent with the present disclosure.

FIG. 5 shows an overhead view of a device (300) consistent with the present disclosure. The device (300) includes a display (450) and a slot (440) connecting a plurality of divots (130). The device (300) has buttons (340), Some of the buttons (340) have a divot (130) within the control (340). Some of the buttons (340) have a divot (130) adjacent to the control (340). The slot (440) includes a variety of shapes connecting adjacent divots (130). The slot (440) includes an open side toward the display (450).

The device (300) may have a plurality of buttons (340) where each control (340) has an associated divot (130) to adjust a parameter associated with the button. The device (300) may have additional buttons (340) unassociated with a divot (130). The device (300) may have additional divots (130) unassociated with a control (340). The associated divot (130) may be proximal to the control (340). The associated divot (130) may be between the control (340) and a display (450). The associated divot (130) may be visually connected to a button by printed material, lines, textures, creases, and/or other signals. The associate divot (130) may contact the control (340), The associated divot (130) may be within the footprint of the control (340).

A variety of shapes to the slot (440) may be used. Example of different slot (440) shapes and their relationship with a divot (130) are shown in FIG. 5. The slot (440) may include features making tracking between a first divot (130) and a second divot (130) easier while relying on tactile feedback. For example, undulated, scalloped, and/or similar shapes may be helpful. In one example, the edge of the slot facilitates motion in one direction but not in the reverse direction, this may be accomplished with a drop and/or other non-smooth feature in the edge.

An edge of a slot (440) may be gradually sloped rather than steep. This allows the first end (120) of the stylus (110) to smoothly track into the slot (440). Another edge of the slot (440) may be steep and/or vertical to inform a user when they've hit the edge of the slot (440). The user can then move the first end (120) of the stylus (110) to find the divot (130) associated with the particular control they wish to adjust.

Figure 4A:
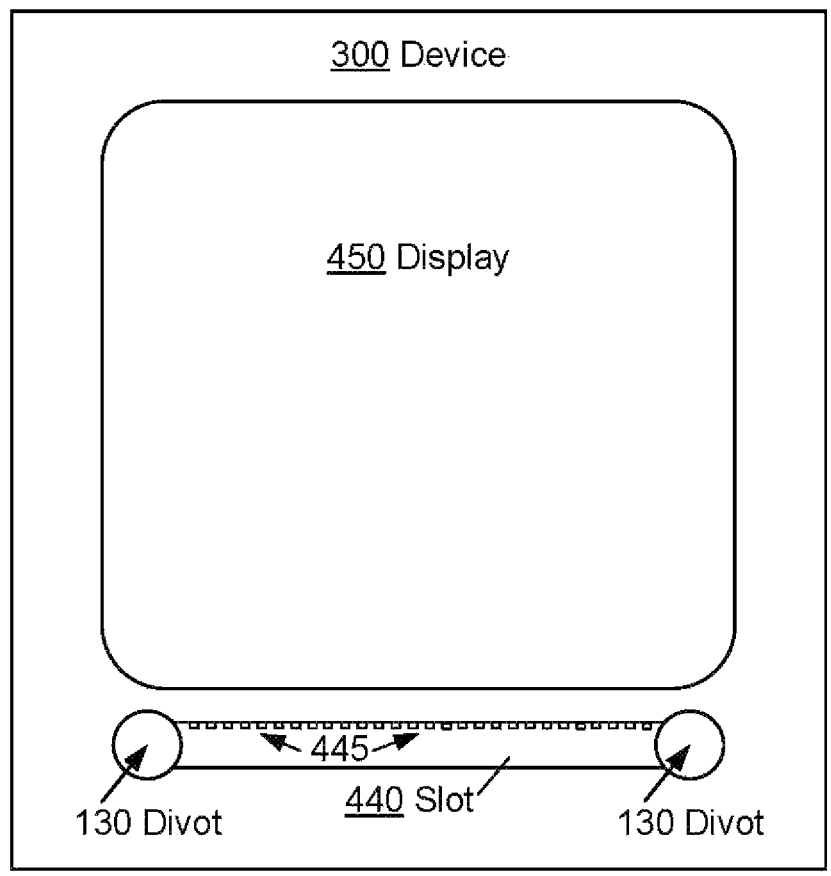
FIG. 4A shows additional possible features of an example of the system described herein.

In one example, an edge of a slot (440) is toothed (445, FIG. 4A). The toothed edge (445) interacts with the first end (120) of the stylus (110) and provides information on the distance the stylus (110) is moved along an edge. For example, moving the stylus (110) left to right along the toothed edge could provide a pan and/or scroll command to a computer.

A slot (440) may radiate from a central divot (130), for example up/down/left/right. A slot (440) may radiate in more and/or other directions, for example, with eight paths at 45 degrees from each other. A slot (440) may include a number of branches, where the branches end in other divots (130). The branches may be angled relative to the parent branch. For example, a slot (440) may extend left from a central divot (130), the left slot (440) may branch into an upper left slot (440) and a lower left slot (440). These slots (440) may branch again and/or have an associated divot (130).

Figure 6:
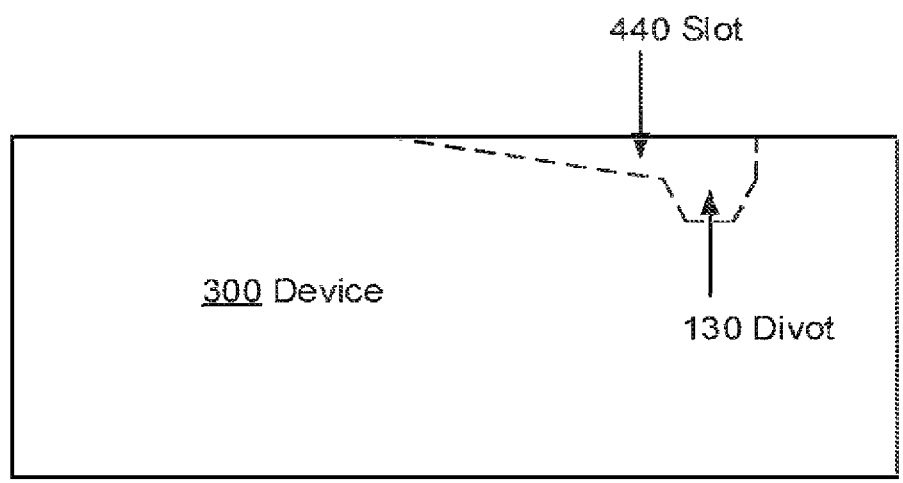
FIG. 6 shows a side view of a device with a slot and a divot according to one example consistent with the present specification.

FIG. 6 shows a side view of a device (300) with a slot (440) and a divot (130) according to one example consistent with the present specification. The slot (440) includes a sloped entry side on the left of FIG. 6 and a steep and/or vertical side on the right. The sloped entry allows tracking of a first end (120) of the stylus (110) into the slot (440) without a drop or bump. The steep side provides a stop to prevent a user from overshooting the divot (130). The divot (130) is used with the stylus (110) to provide input to a computer system. The computer system may be the device (300).

In one example, the slot (440) includes contouring to guide a first end (120) of the stylus (110) to a divot (130). The slot (440) may include multiple guides to different divots (130) or between divots (130). The slot (440) may include texturing on the bottom and/or side(s) to provide tactile feedback to a user.

Figure 7A:
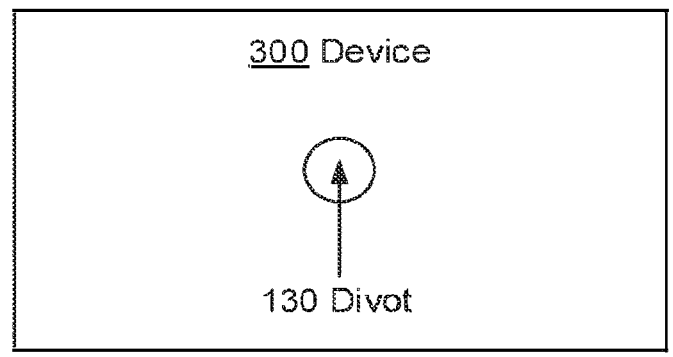
FIGS. 7A and 7B show overhead views of devices consistent with the present disclosure.

FIG. 7A shows a top view of a device (300) with a divot (130) according to one example consistent with the present specification. A single divot (130) may be used in a device (300) without a slot (440). In one example, the device (300) is a temporary and/or disposable with the primary purpose of providing the divot (130) and providing functionality to the divot (130). For example, the device (300) may be attachable to a desk and/or other structure. The device (300) may be a mechanical device, for example, when the functionality is provided by sensors in the stylus (300). In one example, there is a plurality of devices (300) each device containing a divot (130). The divot (130) in a first device (300) may be used to provide input to a computer in a second device (300). For example, a divot (130) in a tablet may be used to provide input to a projector and/or a display of another device (300), In one example, the divot (130) provides information to the stylus (110) which in turn provides information to a local computer, for example, using Bluetooth, an infrared (IR) communication, and/or through a local network. The stylus and/or or device (300) containing the divot (130) may use a second local device (300) such as a phone, to provide information to a device (300) being controlled. This may reduce the requirements for the device (300) containing the divot (130), reducing the cost.

Figure 7B:
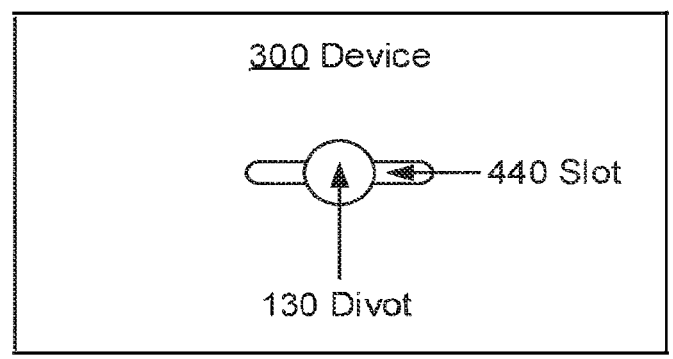
Figure 7C:
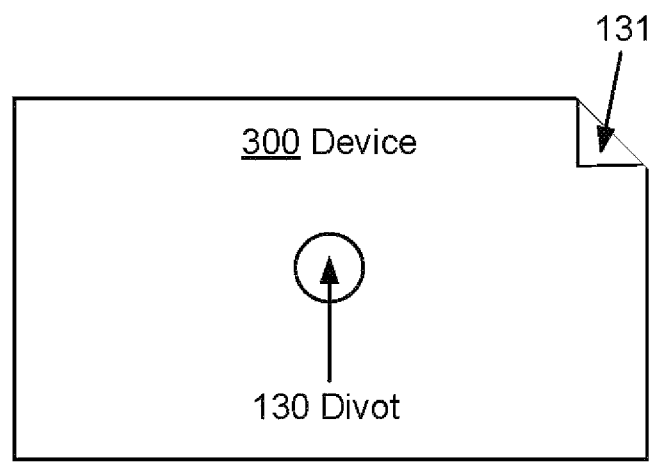
FIG. 7C illustrates the portability and disposable nature of examples of the device.

FIG. 7B shows a top view of a device (300) with a slot (440) and a divot (130) according to one example consistent with the present specification. The slot (440) provides exits to the left and right of the divot (130). This can be used to provide a swipe left/swipe right functionality. Additional slots (440) may be provided, for example, up and/or down, to provide more quick input options. In one example, the device (300) includes 8 slots that radiate out from the divot (130) at forty-five degree intervals.

It will be appreciated that, within the principles described by this specification, a vast number of variations exist. It should also be appreciated that the examples described are only examples, and are not intended to limit the scope, applicability, or construction of the claims in any way.

What is claimed is:

1. A system for providing input to a computer, the system comprising:
   a stylus with a first end, the first end to provide position information to the computer; and
   a plurality of divots,
   wherein, when the first end of the stylus is in a divot, the system detects an orientation of the stylus based on detecting a second end of the stylus that is not in the divot; and
   wherein the plurality of divots are connected by a slot with a toothed edge on a first wall of the slot such that a toothed collar on the first end of the stylus interacts with the toothed edge on the first wall of the slot when moving the first end of the stylus in the slot.

2. The system of claim 1, wherein the slot is along an edge of a display.

3. The system of claim 1, further comprising a camera to detect a position of the second end of the stylus.

4. The system of claim 1, wherein the slot comprises a steep side and a sloped side, such that the stylus may track into the slot down the sloped side and stop when contacting the steep side.

5. The system of claim 1, the system detects when a first end of the stylus in a divot and the system identifies which divot among the plurality of divots contains the first end of the stylus.

6. The system of claim 1, further comprising:
   a control; and
   a divot of the plurality of divots that is associated with the control, wherein placing a stylus into the divot associated with the control allows adjustment of a parameter associated with the control using the stylus.

7. The system of claim 6, further comprising a plurality of controls each with a different associated divot from among the plurality of divots, wherein placing the stylus in a divot allows adjustment of a parameter of the associated control using the stylus.

8. The system of claim 7, wherein:
   a first control is for speaker volume and rotation of the stylus in the associated divot raises or lowers speaker volume; and
   a second control is for display brightness and rotation of the stylus in the associated divot increases or decreases display brightness.

9. The system of claim 6, wherein the control is a button and the divot is in the button.

10. The system of claim 1, wherein the first end of the stylus comprises a target distinguished by a visual pattern.

11. The system of claim 1, wherein the second end of the stylus comprises a target comprising a Radio Frequency identification (RFD) tag.

12. The system of claim 1, wherein the second end of the stylus emits a signal.

13. A system for providing input to a computer, the system comprising:
    a stylus with a first end;
    a plurality of divots to receive the first end of the stylus; and
    a toothed collar on the first end of the stylus and a toothed perimeter of at least one of the divots, such that the toothed collar and the toothed perimeter mesh when the first end of the stylus is in the divot;
    wherein rotation of the stylus about a longitudinal axis of the stylus is detected and provided as the input to the computer; and
    wherein the plurality of divots are connected by a slot with a toothed edge on a first wall of the slot such that the toothed collar interacts with the toothed edge on the first wall of the slot when moving the first end of the stylus in the slot.

14. The system of claim 13, further comprising a torque sensor, wherein the torque sensor detects a torque applied to an interface between the toothed collar and the toothed perimeter when the stylus is rotated while the first end of the stylus is in the divot.

15. A method of providing information to a computing system, the method comprising:
    detecting placement of a first end of a stylus into a divot of a plurality of divots;
    interfacing a mechanical element including a toothed collar on the first end of the stylus with a toothed perimeter of the divot;
    sensing a torque between the divot and the stylus indicating rotation of the stylus in the divot about a longitudinal axis of the stylus;
    and providing information into the computer system based on the rotation of the stylus;
    wherein the plurality of divots are connected by a slot with a toothed edge on a first wall of the slot, the method further comprising interfacing the toothed collar on the first end of the stylus with the toothed edge on the first wall of the slot when moving the first end of the stylus in slot.

16. The method of claim 15, further comprising:
   in response to detecting the first end of the stylus in the divot, indicating a parameter on a display of the computing system, and
   in response to manipulation of the stylus while the first end of the stylus remains in the divot, updating display of the parameter.

17. The method of claim 15, wherein the divot is a disposable unit, the method further comprising placing the disposable divot unit for use with the computing system prior to disposal.

18. The method of claim 15, further comprising controlling a speaker volume of the computer system based on the rotation of the stylus in the divot.

19. The method of claim 15, further comprising controlling a display brightness of the computer system based on the rotation of the stylus in the divot.

* * * * *